United States Patent
Dunkin et al.

(10) Patent No.: US 9,693,200 B2
(45) Date of Patent: Jun. 27, 2017

(54) METHOD AND SYSTEM OF PROVIDING DATA SERVICE ACCORDING TO A USER'S FUTURE LOCATION

(71) Applicant: VODAFONE IP LICENSING LIMITED, Newbury, Berkshire (GB)

(72) Inventors: Andrew Dunkin, London (GB); Usman Javaid, London (GB); Nikolaos Lioulis, London (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 14/777,462

(22) PCT Filed: Mar. 3, 2014

(86) PCT No.: PCT/GB2014/050613
§ 371 (c)(1),
(2) Date: Sep. 15, 2015

(87) PCT Pub. No.: WO2014/140525
PCT Pub. Date: Sep. 18, 2014

(65) Prior Publication Data
US 2016/0021508 A1     Jan. 21, 2016

(30) Foreign Application Priority Data
Mar. 15, 2013    (GB) .................................. 1304809.5

(51) Int. Cl.
*H04W 24/00*     (2009.01)
*H04W 4/02*     (2009.01)
(Continued)

(52) U.S. Cl.
CPC ........ *H04W 4/027* (2013.01); *G01C 21/3415* (2013.01); *G01C 21/3446* (2013.01);
(Continued)

(58) Field of Classification Search
CPC ..... H04W 4/027; H04W 4/028; H04W 4/046; H04W 24/02; H04W 36/0083;
(Continued)

(56) References Cited

U.S. PATENT DOCUMENTS 5,572,221 A * 11/1996 Marlevi ................ H04W 28/18
                                      342/452
6,119,006 A * 9/2000 Shaffer ................ H04M 7/006
                                      455/440

(Continued)

FOREIGN PATENT DOCUMENTS

EP     1598985 A1    11/2005
EP     1737160 A1    12/2006
(Continued)

OTHER PUBLICATIONS

International Search Report for PCT/GB2014/050613 dated May 26, 2014.
(Continued)

*Primary Examiner* — Marceau Milord
(74) *Attorney, Agent, or Firm* — Workman Nydegger

(57) ABSTRACT

According to one aspect of the present invention there is provided a method for controlling data service for a user of a telecommunication network. The method comprising: retrieving data associated with historical behavior of the user within the network; predicting, based on said data and on a current user location within the network, a future user location within the network; performing a determination of network capability at the future user location; and modifying, in response to the determination, a configuration of the network and/or a service parameter associated with the user. A network element, system and computer program product are also provided.

24 Claims, 3 Drawing Sheets

(51) Int. Cl.
*H04L 29/08* (2006.01)
*H04W 4/04* (2009.01)
*H04W 24/02* (2009.01)
*H04W 36/00* (2009.01)
*H04W 40/34* (2009.01)
*G01C 21/34* (2006.01)
*H04W 88/08* (2009.01)

(52) U.S. Cl.
CPC ......... *H04L 67/2847* (2013.01); *H04W 4/028* (2013.01); *H04W 4/046* (2013.01); *H04W 24/02* (2013.01); *H04W 36/0083* (2013.01); *H04W 40/34* (2013.01); *H04W 88/08* (2013.01)

(58) Field of Classification Search
CPC .. H04W 40/34; H04W 88/08; G01C 21/3415; G01C 21/3446; H04L 67/2847
USPC ...................... 455/456.1, 436, 442
See application file for complete search history.

(56) References Cited

U.S. PATENT DOCUMENTS

| | | | | |
|---|---|---|---|---|
| 8,213,388 B2* | 7/2012 | Pathan | ................ | H04W 28/26 370/332 |
| 8,249,596 B2* | 8/2012 | Shaffer | ................ | H04W 36/32 455/436 |
| 8,364,141 B1* | 1/2013 | Kateley | ................ | H04W 24/08 370/216 |
| 8,639,260 B2* | 1/2014 | Fox | ................ | H04W 28/10 455/418 |
| 8,798,641 B2* | 8/2014 | Persson | ................ | H04W 64/006 455/456.1 |
| 8,825,407 B2* | 9/2014 | Brennan | ................ | G06Q 10/06 701/540 |
| 8,832,003 B1* | 9/2014 | Bowers | ................ | G06F 9/50 706/12 |
| 8,885,466 B1* | 11/2014 | Seleznyov | ............ | H04W 4/001 370/229 |
| 8,989,113 B2* | 3/2015 | Mukherjee | ........ | H04W 74/0833 370/329 |
| 9,332,458 B2* | 5/2016 | Nuss | .................... | H04W 28/08 |
| 9,462,489 B2* | 10/2016 | Movva | ................. | H04W 24/02 |
| 2004/0085909 A1* | 5/2004 | Soliman | ................ | H04W 24/02 370/252 |
| 2006/0286988 A1* | 12/2006 | Blume | ............... | G01C 21/3679 455/456.1 |
| 2009/0203379 A1* | 8/2009 | Karaoguz | ............. | H04W 36/32 455/436 |
| 2010/0323715 A1* | 12/2010 | Winters | ................ | G01S 5/0027 455/456.1 |
| 2012/0009890 A1* | 1/2012 | Curcio | .................... | H04L 29/06 455/230 |
| 2013/0143561 A1* | 6/2013 | Nuss | .................... | H04W 24/02 455/436 |
| 2015/0087325 A1* | 3/2015 | Nuss | .................... | H04W 28/08 455/453 |

FOREIGN PATENT DOCUMENTS

| | | |
|---|---|---|
| EP | 2088818 A2 | 8/2009 |
| EP | 2403290 A1 | 1/2012 |
| EP | 2555569 A1 | 2/2013 |
| WO | WO 9613951 A1 | 5/1996 |
| WO | WO 9830045 A2 | 7/1998 |
| WO | WO 2005064969 A1 | 7/2005 |
| WO | WO 2011150971 A1 | 12/2011 |

OTHER PUBLICATIONS

UKIPO Search Report for GB1304809.5 dated Aug. 20, 2013.
CCD view for GB20130004809, retrieve online http://ccd.fiveipoffices.org/CCD-2.0.4/html/viewCcd.html?num=GB2 on Dec. 15, 2015.
Examination Report issued in European Patent No. 14709743.0, dated Mar. 29, 2017.

\* cited by examiner

METHOD AND SYSTEM OF PROVIDING DATA SERVICE ACCORDING TO A USER'S FUTURE LOCATION

BACKGROUND

Operators of cellular telecommunications networks are ever trying to improve the efficiency of the networks and optimise network performance as poor customer experience and service loss can result in customer dissatisfaction. In conventional cellular telecommunications networks, when the user is requesting a data service, such as downloading an application or streaming audio or video data, the quality of service provided to that user is directly related to network conditions for example radio coverage and delay. If the user moves into a white spot while requesting data service, for example while travelling in a car or on a train, the data service may be interrupted (i.e. will stop receiving the data service until coverage is recovered) or may be lost completely as the data link may be damaged. A white spot is a term used in the art to describe a geographical region lacking radio coverage. Such a loss of data service results in customer dissatisfaction and often customer complaints. There is therefore a need to reduce the effects of poor service coverage on the end user in order to improve the customer experience.

It has previously been described, for example in European Patent Publication No. 2,403,290, that a network operator may be able to gauge future radio conditions experienced by a user by prediction. In order to make this prediction, the network may build and maintain a record of radio quality across a coverage area of the network and may use this record to predict the radio conditions available to the mobile terminals within that coverage area. The network will typically calculate the present location and/or velocity of the user in order to predict the future location of that user. By consulting the record of radio quality across the coverage area the network is able to estimate the radio conditions available to that mobile terminal at a future location.

If it is determined that future radio conditions are poor then the network may increase the data throughput provided to that user at its present location. The user can then store this received information in a buffer so that the data is temporarily stored for future use when the radio conditions are poor. Alternatively, if it is determined that future radio conditions are good, then the network may decrease the data throughput provided to that user at its present location since the user will not need to use stored data at the future location in order to receive a constant service.

Additionally, it is known from for example European Patent Publication No. 2,555,569, that network parameters (such as resource allocation and resource prioritisation, radio parameters and Quality of Service, QoS, parameters) and service parameters (such as resolution and time of delivery) can be adjusted for a specific data service based on the future radio conditions determined using the current location and velocity of the user. Predicting the future location of a user based on current location and velocity in this way is highly inaccurate as a simple left turn will dramatically alter the predicted destination. The future location could be recalculated after this turn but this would impose large overheads and require constant iterative recalculation. There would also be only a period of time in the future that the location could be predicted for. There can be no accurate long term prediction of coverage.

In U.S. Pat. No. 6,125,278 it has been described that location data can be sent from the user to the network and combined with current location and velocity data to predict the future location of the user. Whilst this may increase the accuracy of location prediction over the use of current location and velocity data alone, the inaccuracy of this method is still undesirable and the use of device information in this way introduces undesirable data and processing overheads into the system.

SUMMARY OF THE INVENTION

According to a first aspect of the invention there is provided a method for controlling data service for a user of a telecommunication network, the method comprising: retrieving data associated with historical behaviour of the user within the network; predicting, based on said data and on a current user location within the network, a future user location within the network; performing a determination of network capability at the future user location; and modifying, in response to the determination, a configuration of the network and/or a service parameter associated with the user. In determining future location in this way the method is able to accurately determine future location. For example, the method is able to predict whether a user travelling in a vehicle while requesting data service and approaching a junction will turn left, right or continue straight on without receiving substantial information from the device. Known methods must assume a constant direction of travel. Further, the method is able to accurately predict long term future location as well as location in the immediate future so that modifications can be appropriately planned and the effects of the modifications accurately predicted.

By modifying configuration of the network the method is able to adjust the service offered near to any potential white spot as well as the service offered at the current location. Additionally, the method is able to appropriately provide consistent service to the user while managing and mitigating other effects of the modification.

The modifying step may be optionally performed in accordance with a profile of the user. For example, certain actions may be taken based on the data consumption, contract details and payment information of the user. In this way the service can be tailored to the needs of the operator and user to provide a consistent experience to those important users who are identified by the operator as having a degree of importance based, for example, on their role, their data consumption or their price plan.

The modifying step may also be optionally performed based on a data service requested by the user. For example, if the data service is a streaming service, certain actions may be performed to ensure the stream is not lost whereas if the data service is email then other actions may be taken in order to mitigate effects on other users.

The method may further comprise tracking the user within the network using information about handover and cell connections. In this way the location of the user can be approximately determined without device information. The user could also be tracked for example using a GPS location of the user or using a triangulation method to locate the user.

The method may further comprise calculating a probable user route between the current user location and the future user location. The predicting step may also include predicting a series of future locations. The method may further comprise calculating a probable user route based on the series. Further, the method may comprise detecting user deviation away from the route. Additionally, in response to detection of user deviation away from the route, the method may comprise recalculating the series and recalculating the route. For example, a user might change route from the predicted route and choose an alternative one. The user can be tracked in one example by using the user's location or based on cell connections and cell handovers.

The modifying step may also include providing instructions to a base station of the telecommunication network. Thus the modification can be tailored to the service provided. Further, the base station may be a base station located between the current user location and the future user location wherein the future user location is a white spot. In this way, the customer experience is improved as the user travels through an area of coverage deficiency. The base station may also be a base station located adjacent the future location within the network such that customer experience is effectively optimised during the area of coverage deficiency.

The historical behaviour may include cell connections, cell measurements and/or requested data services. Thus the future location can be predicted without substantial information transmitted by the device.

The modifying step may comprise: tilt adjustment of a base station of the telecommunication network; beam steering; configuration of handover parameters; expanding a cell range of the telecommunication network; increasing transmit power of a base station of the telecommunication network; adjusting resources scheduled to the user; and/or, traffic steering. Other measures for the modifying step could be considered by the person skilled in the art, and these measures would be equally applicable to this invention so long as they would not require a substantial modification of the claimed steps.

Further, the modifying step may comprise identifying that the user is a priority user.

The predicting step may comprise performing statistical analysis on the data. Thus the future location can be predicted to a certain degree of probability.

In accordance with a further aspect of the present invention there may be provided a network element of a telecommunication network adapted to control data service for a user, the network element adapted to carry out any of the above steps.

In accordance with a further aspect of the present invention there may be provided a telecommunications network comprising a network element adapted to carry out any of the above steps, a user equipment, a radio access network comprising a base station and a core network.

In accordance with a further aspect of the present invention there may be provided a computer program product comprising memory comprising instructions which when executed by one or more of the processors cause a network element of a telecommunication network to perform any of the above steps.

BRIEF DESCRIPTION OF THE DRAWINGS

An example of the present invention will now be described in detail with reference to the accompanying drawings, in which.

DETAILED DESCRIPTION

In the following description, reference may be made to Global System for Mobile Communications (GSM), Universal Mobile Telecommunications System (UMTS), Long Term Evolution (LTE) and to particular standards. However it should be understood that the present disclosure is not intended to be limited to these.

The present invention may also be applicable to a number of modes of transmission such as Time Division Duplex (TDD), Frequency Division Duplex (FDD), Time Division-Synchronous Code Division Multiple Access (TD-SCDMA), and High Speed Downlink Packet Access (HS-DPA), among others.

While devices are often referred to as "mobile" in the description herein, the term "mobile" should not be construed to require that a device always be mobile, merely that it has the capability of being in communication with a wireless telecommunications network which allows mobility. For instance, a PC terminal or a machine to machine client that is never moved from a particular geographic location may in a sense still be considered mobile as it could be moved to a different location yet still access the same network. Where the term "mobile device" is used in the present discussion it is to be read as including the possibility of a device that is "semi-permanent" or even "fixed" where the context does not contradict such an interpretation.

Figure 1:
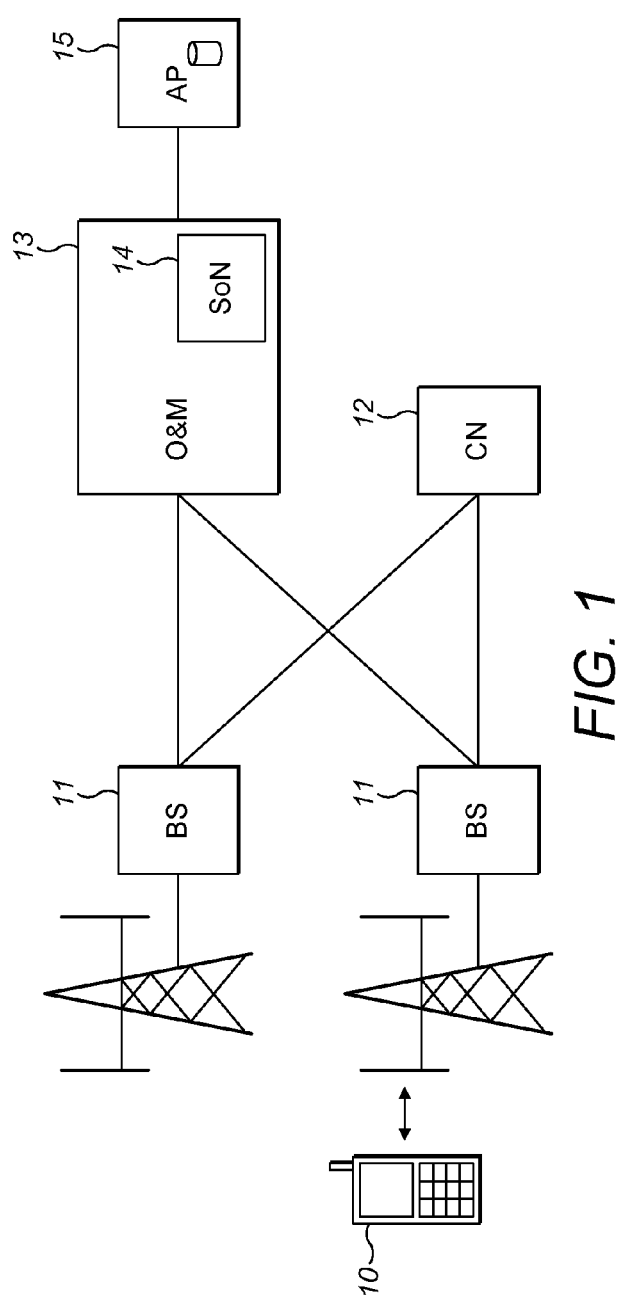
FIG. 1 shows an exemplary network architecture.

In a typical cellular radio telecommunications network, with reference to FIG. 1, a mobile device 10 communicates via one or more radio access networks (RAN, not shown) to one or more core networks 12. The RAN includes a plurality of base stations (BS) 11, each base station (BS) 11 corresponding to a respective cell of the telecommunications network. The devices 10 may be handheld mobile telephones, personal digital assistants (PDAs), smartphones, tablet computers or laptop computers equipped with a data card among others. In a UMTS or LTE system, such devices are typically referred to as User Equipment (UE). In a GSM system, such devices are typically referred to as Mobile Stations (MS). In the description herein both terms may be used interchangeably; however it will be noted that the term UE will be used predominantly.

Typical known methods of scheduling resources for UEs separate users into two categories, i.e. those users with priority and those users without. When a user enters a cell with high priority that user is given priority over other users in the cell. Priority is defined for example according to the service requested by the user and based on the level of data to be allocated to that user in order for that user to have constant service. A user can also be prioritised based on other factors such as data consumption and contract. A high priority data service may be a guaranteed bit rate (GBR) data service. GBR services may be conversational voice, conversational video (live streaming), real-time gaming services and non-conversational video (buffered streaming). Of course other services can be GBR services and the above are merely exemplary. A GBR value may be assigned which represents the bit rate that can be expected to be provided. Non-GBR services may be signalling and other data services such as email.

There is conventionally no consideration of the future radio conditions of a user when these priorities are assigned. A user is treated with priority only when radio coverage is available. When coverage is lost there are currently no measures taken by telecommunications networks to prevent a failure or reduction in the customer service.

Referring back to FIG. 1, each Base Station 11 also communicates with an Operations & Maintenance system (O&M) 13 which performs management functions for the network. Great emphasis has been made in recent years on the development of Self-organising networks (SONs) 14 which are a software tool forming part of the O&M system 13. These networks introduce smart functions within the network management domain of the network allowing tasks to be automated. SONs have three main aims and functionalities: self-configuration, self-optimisation and self-healing. Radio measurements performed by the base station 11 and the terminal 10 may be used to build an underlying trend of data performance such that non-real time optimisation tasks can be performed by the SON 14 to target network errors and increase the underlying data performance. These tasks typically include determining neighbour cell relationships, and configuring cell parameters to perform general optimisation of the radio environment. In summary, the SON 14 and O&M 13 may configure the BSs 11 in order to optimise network performance and increase the efficiency of the network based on the data received.

Recently it has become commonplace for network operators to store information received from terminals 10 and BSs 11 and pass this information to an analytics platform 15 which is operable to perform statistical analysis on the stored data to identify the 'habits' of the user for network optimisation or for commercial use. In this context, analytics typically means a platform of tools that collect information regarding user experience of any kind (location, performance, complaints, user habits etc.) and store this information in databases.

The analytics platform may be separate from or integral with the O&M 12. The information stored may be stored on a per UE basis or preferably on a per user basis. The information used by the analytics platform may include the type of UE operated by the user, the performance achieved during the day or the type of data services requested. Other information stored may include cell handover information, measurements received from the UE or made by the base stations and cell connection statistics. These are of course merely exemplary data only and it will be understood that any data available may be stored for subsequent analysis. The data can be configured to be stored for every user or for select users only.

The present invention utilises the data stored in the analytics platform 15 in order to predict the statistically probable future location of a terminal within the network. Based on this predicted location, the network can be configured to provide a consistent customer experience.

Figure 2:
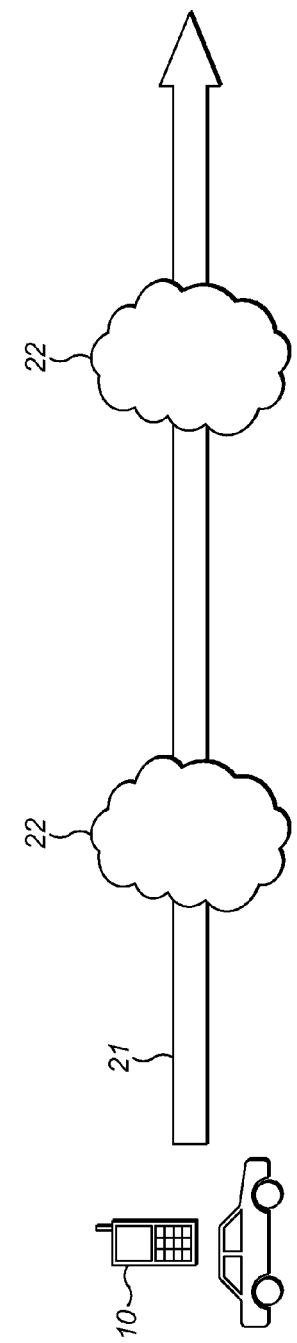
FIG. 2 shows a user travelling along a set route.

Throughout the description an example of a user travelling on the M4 motorway from London to Newbury will be used to illustrate different principles of the invention. Referring to FIG. 2, the user travelling along the M4 and operating a UE 10 may request a data service such as a music streaming service. The music streaming service may download the music into a buffer from a remote database for subsequent playback on the device. When the UE 10 travels along the route 21, it passes through two white spots 22 which cause the data service to be interrupted or lost completely. In this analogy, if the user is currently at a first junction of the motorway and a white spot 22 occurs at a later junction of the same motorway, conventional prediction methods will predict using the velocity of the UE that the user will experience the white spot and at what time. However, by analysing historical network behaviour associated with the user, the present algorithm is able to predict that in fact the user never gets to the later junction with the white spot, because every morning the user exits at an earlier junction. Thus, in accordance with the principles of the present invention and/or their implementation, there will be no prediction of experiencing a white spot.

Figure 3:
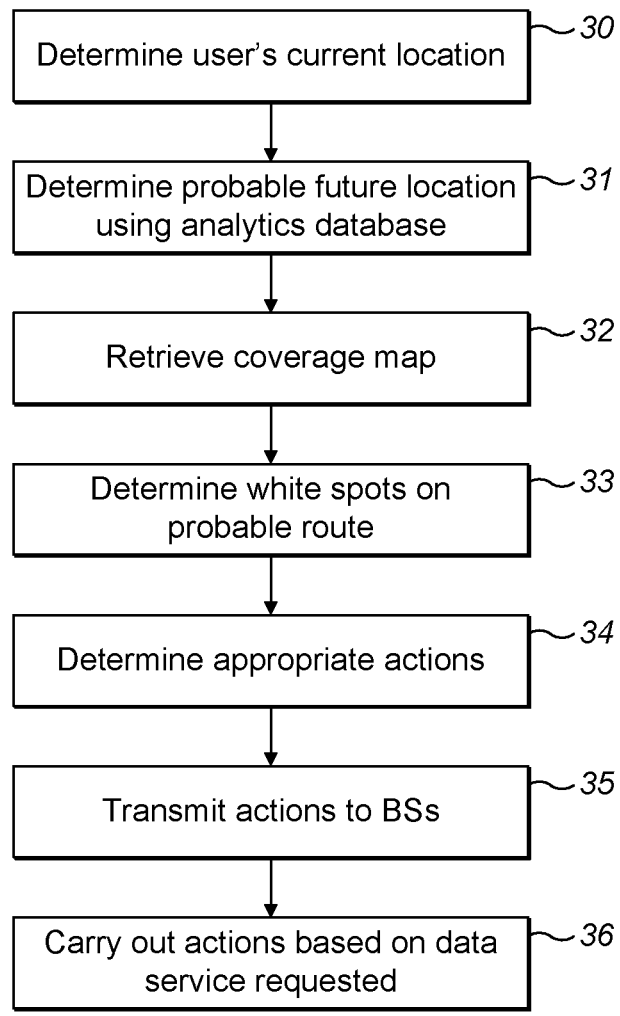
FIG. 3 is a flow diagram depicting a process according to an embodiment of the present invention; and, FIG. 4 illustrates schematically a user travelling through a series of cell areas.

FIG. 3 is a flow chart depicting the process carried out in accordance with an embodiment of the present invention to provide a consistent service to a user.

First, the network determines the current location of the user (step 30).

A variety of methods are envisaged for determining the location of the user operating a UE. In a first exemplary method, the base station may be operative to determine the location of the UE based on triangulation. For example, an analysis of communications with a plurality of base stations may result in the specific location of the UE being determined. If each base station knows its specific location through GPS, by triangulation, the specific location of the UE can be determined.

In a further exemplary method, the base station may be operable to request that the UE transmits its location in the form of a GPS signal. This method is known as GPS synchronisation. The UE may determine its location by using its GPS upon request and transmit the resulting values to the base station for use in location determination. To reduce processing requirements, the base station may be subsequently operable to assume that the GPS value is valid for a pre-determined amount of time.

In a further exemplary method, the base station may be operative to determine the location of the UE based on the angle of arrival of the signal.

The above methods of determining location may be used in isolation or in combination. A combination may be beneficial since it may increase the accuracy of the measurement. Alternatively a combination may be to reduce processing requirements. One method may be used in preference to another, for example, the GPS method may be used if available and another method used if it is not. Any other suitable method of determining the location of the UE may be used with the present invention.

Once the current location of the user is identified, the network is then operable to determine the probable future location of the user (step 31). To identify the probable future location, the network may perform a statistical analysis of data stored by the network. The analysis may be performed by the O&M 13 or by the analytics platform 15. As above, the stored data may include historical data of the behaviour of the user within the network.

Referring back to our example of the user travelling on the M4 motorway, if the user travels this same journey on a daily basis to work the stored data will indicate this. For example, the cell connections, determined location data, and base station power measurements will indicate a trend in use. By performing a statistical analysis on the stored data the network is able to determine that there is a high percentage chance that the user will be following a particular route.

When the user does actually move along the route the user can be tracked using cell handovers and cell connections in order to reduce processing requirements. Of course, the user can also be tracked along the route by making periodical assessments of the location of the user in the manner described above. If the user veers away from the predicted route then this information can be fed back into the location determining algorithm to iterate the process and recalculate a probable route and potential coverage anomalies.

For the purposes of the present example, it will be assumed that the user travels the same route every day and that the statistical analysis has determined that there is a 90% chance that the user will travel along the set route along the M4.

Next, the network will retrieve a coverage map (step 32). The coverage map can be manually generated or generated using an analysis of the data stored by the analytics platform for all users. For example, if five different UEs travel the route from London to Newbury and each suffer a service outage at the same place the analysis will determine that there is a white spot at that location. Additionally, if ten separate UEs notify the network of poor performance using a poor performance alert then this location can be added to the map as a weak link. Typically when a UE loses service completely a report is sent to the network indicating that the service has failed or that connectivity or handover has failed once connection is re-established. This data can be stored and forms part of the data used by the analysis to generate the coverage map. Any suitable data or alert can be used by the analysis platform 15 to generate the coverage map.

Analysis such as the above is able to determine how strong the signal is, how weak the signal is and other aspects of the signal which can be used to generate a very detailed coverage map. The coverage map can be configured according to the needs of the operator. For example, the map can be re-calculated periodically, i.e. every day, every month or every time a new node is added to the network, and the detail can be configured as required.

The coverage map can be generated in real-time, but typically this is not the case since the processing requirements are significant. The coverage map will depend on base station deployment and so is usually generated periodically. If a base station failure or outage is detected then an alarm may be generated in the network. Once this is identified the map may be updated either by rerunning the algorithm or making an amendment to the latest map.

Once the coverage map has been retrieved (step 32) the O&M 13 is operable to compare the predicted route of the user with the coverage map to determine potential white spots in coverage or other notable coverage anomalies such as areas of particularly good signal (step 33).

Referring back to our example, the O&M 13 has now determined that the user will probably be following the route of the M4 from London to Newbury since the user travels this same route every day and that along this route there are, for example, two potential white spots in coverage.

The O&M 13 is then operable, together with the SON 14 functionality to determine how to solve this problem and provide consistent service to that user including determining the appropriate actions to be taken (step 34). The actions that can be taken include any suitable configuration of the network and/or service parameters associated with the user to alleviate the effects of any coverage deficiencies on the service identified by the user. The actions may include modification of the any suitable configuration of the network and/or service parameters associated with the user before the user Once the appropriate actions have been identified, the actions are transmitted to the relevant Base Stations (step 35). Finally, the BS will carry out the action instructed by the O&M (step 36) and the effects of the white spots will be alleviated or removed such that there is no service gap and the user experience is consistent despite a loss of radio coverage.

Additionally, when the user connects to the relevant Base Station it may first check which service the user is requesting. If the service is a priority service such as downloading data or streaming audio, the BS 11 will carry out the actions instructed by the O&M 13. If the service is not a priority service then no actions may be taken. The level of service that should invoke action may also be instructed by the O&M 13.

The network may integrate a specific message to be sent to the UE or BS as part of the system.

In a first example of appropriate actions that can be taken, the network may carry out enhanced scheduling. In an example of enhanced scheduling, the BSs close to the bad area of coverage are requested by the O&M to allocate as many resources as possible to the user in accordance with the scheduling algorithm used so that as much data as possible is buffered at the UE to be used when there is no coverage.

Referring back to the example of the user travelling on the M4 from London to Newbury, the cell serving the area before the white spot on the route will allocate as many resources (e.g., resource blocks, data frames, etc.) as possible to the user so that the music streamed is buffered and can still be played while the user travels through the white spot along the route.

A similar principle applies to non-streaming applications. For example, the experience may be increased prior to the white spot when downloading data so that overall the user gets the same experience that would be offered if the white spot did not exist.

As described above, the actions that can be taken include any suitable configuration or combination of configurations of the network and/or service parameters associated with the user. These include, but are not limited to, the following:

Enhanced scheduling—Enhanced scheduling can be applied to offer more resources to specific users in order to cover their needs prior to a white spot. An example of enhance scheduling is described above.

Adjust tilt of BSs—The network is operable to remotely adjust, vertically or horizontally, the tilt of each base station in order to offer better coverage.

Beam steering functionality—BSs are operable to adjust their beam form and focus on a specific area, enhancing the coverage of that specific area and correspondingly the performance.

Handover configurations—The network is operable to change the handover parameters in order to delay a handover procedure if necessary. In this way the service of a user can be maintained for as long as possible before a loss of connectivity.

Cell range expansion—The network is operable to virtually expand the coverage of the cell. To do this, the network applies a bias value to measurements made by users in the cell edge area of a cell. In a UMTS cellular communication system, received signal code power (RSCP) denotes the power measured by a receiver on a particular physical communication channel. It is used as an indication of signal strength, as a handover criterion, in downlink power control, and to calculate path loss. Practically, when a user is estimating the RSCP value, a bias can be added that allows the total RSCP measurement to be improved and thereby keep a userconnected to a cell. So, we have:

$$RSCP+Bias=RSCP_{new} \text{ (dB)}$$

In an example, when the user is the edge of the cell the RSCP is near the levels that Handover is triggered (e.g when RSCP<−90 dBm we trigger a Handover). Now the base station can apply Cell Range Expansion where, as indicated above, it applies a Bias value to the measurement of the device e.g if Bias=3 dB than when UE is actually measuring −90 dBm and should Handover, it calculates −90+3=−87 dBm and this way it continues to stay connected in the cell.

Increased transmit (Tx) power of BSs—Where necessary, the transmit power of the BS can be increased in order to offer better coverage in an area.

Traffic steering—If required, users can be offloaded to other layers such as Macro cells, small cells or Wi-Fi in order to enhance the experience before a white spot. This is particularly beneficial in Heterogeneous Networks (HetNets). HetNets are multi-layer networks with base stations of various sizes used to fill gaps in coverage and serve high use areas in order to increase user satisfaction and communication throughputs. The provision of HetNets is one way in which network operators are attempting to reduce the effects of white spots on the customer experience.

Once the actions have been carried out and the user moves to a different area or stops requesting the data service, the network can be returned to its normal configuration.

In one implementation of the described process, when the UE enters a specific location an alarm may be triggered in order to start the process. For example, when the user enters the M4 from London the network may raise an alarm that causes the future location to be determined. This alarm may be raised by the UE or the network. Alternatively, the process may be constantly run or may be run periodically. Additionally, the process may be triggered when a user requests a specific data service. For example, streaming audio may be defined as a particularly high priority data service such that it is important that constant service be provided. When this service is requested, the network may identify that it is a high priority service and accordingly may check the location and perform the remaining steps of the method.

The network may take into account the profile of the user when implementing the described process. For example, elements of the user profile that may be taken into account—as they may affect the service provided—include data consumption, contract details and payment information. For example the method may only be carried out for those users designated as important or high priority. This check may be performed prior to the route analysis or at the action implementation stage in the BS.

Additionally, the actions that may be taken by the BS may depend both on the service requested and the profile of the user. If an important user requests an important service then all actions may be available but an unimportant user may only be permitted certain actions and may be allocated resources according to their importance.

In an example of the described process, if there are cell users which are GBR and non-GBR, the network may treat the GBR users with higher priority meaning that when the new user (with GBR) enters the cell he is given priority over the non-GBR users. This is a conventional scheduling algorithm. The present solution proposes that that user is not only given priority but that scheduling also takes into consideration that he will soon enter a white spot. The user is given an even higher priority, taking more resources (intended for non-GBR users) than he would otherwise take using conventional scheduling algorithm in order to cover the needs of that user. GBR users are defined according to the service and based on that the network may determine the level of data to be allocated to the user in order to have constant service.

Figure 4:
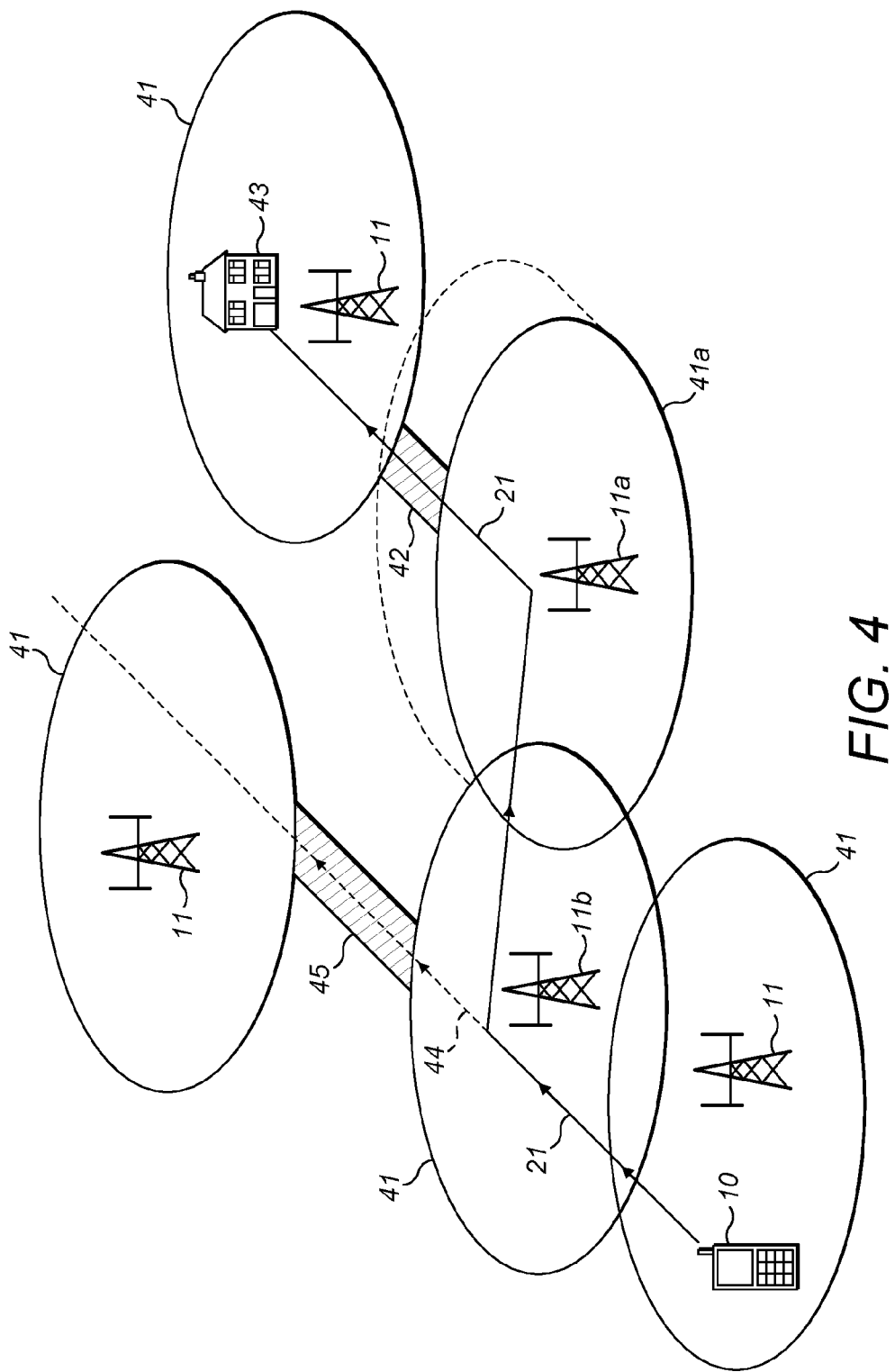

The above method will now be summarised in the context of the schematic illustration of FIG. 4. A user operating UE 10, travels along a route 21 passing through the cell areas 41 covered by several Base Stations 11. Based on a statistical analysis of the historical behaviour of the user within the network, the network is able to predict that the user will travel along this route and will encounter a white spot 42 by consulting a coverage map. In order that consistent service be provided to this user 10, who is determined to be a VIP, the base station 11a is instructed by the O&M to vary its coverage area by either adjusting the tilt of the base station or by beam forming. As indicated by the dotted line, the cell area 41a is expanded so that the white spot does not affect the user and a consistent experience is provided to user until it reaches its destination 43.

Also illustrated in FIG. 4 is the route that would be predicted if known methods based on velocity and current location were used to determine potential white spots. If the user began travelling on route 21 and did not veer off as predicted using analysis of historical behaviour, then it would be assumed that route 44 would be followed. This would lead the user 10 to white spot 45. Accordingly, the O&M might incorrectly and unnecessarily instruct Base Station 11b to alter its behaviour, possibly be scheduling resources to the user unnecessarily to the detriment of other users.

The invention claimed is:

1. A method for controlling data service for a user of a telecommunication network, the method comprising:
   retrieving data associated with historical behavior of the user within the telecommunication network;
   predicting, based on said data and on a current user location within the telecommunication network, a future user location within the telecommunication network;
   performing a determination of network capability at the future user location to identify a degradation in telecommunication network link quality at the determined future user location;
   modifying, in response to the identified degradation in network link quality, a configuration of the telecommunication network and/or a service parameter associated with the user; and
   performing, in response to the step of modifying, at least two of the following:
      prioritizing specified data services over other data services;
      communicating service-related data from the telecommunication network to user equipment associated with the user for storage in the user equipment, such that the service-related data is cached in the user equipment for use during a time period when the user is in the determined future user location within the network; and
      maintaining any calls and web-browsing sessions provided by the telecommunications network at a predetermined level.

2. A method according to claim 1, in which the modifying step is performed in accordance with a profile of the user.

3. A method according to claim 1 in which the modifying step is performed based on a data service requested by the user.

4. A method according to claim 1, further comprising tracking the user within the telecommunication network using information about handover and cell connections.

5. A method according to claim 1, further comprising calculating a probable user route between the current user location and the future user location.

6. A method according to claim 1, in which the predicting step includes predicting a series of future locations, the method further comprising calculating a probable user route based on the series.

7. A method according to claim 6, further comprising detecting user deviation away from the route.

8. A method according to claim 7, further comprising, in response to detection of user deviation away from the route, recalculating the route.

9. A method according to claim 1, in which the modifying step includes providing instructions to a base station of the telecommunication network.

10. A method according to claim 1, in which the base station is a base station located between the current user location and the future user location wherein the future user location is a white spot.

11. A method according to claim 1, in which the base station is a base station located adjacent the future user location within the telecommunication network.

12. A method according to claim 1, in which the historical behavior includes or is based on cell connections, cell measurements and/or requested data services.

13. A method according to claim 1, in which the modifying step comprises tilt adjustment of a base station of the telecommunication network.

14. A method according to claim 1, in which the modifying step comprises beam steering.

15. A method according to claim 1, in which the modifying step comprises configuration of handover parameters.

16. A method according to claim 1, in which the modifying step comprises expanding a cell range of the telecommunication network.

17. A method according to claim 1, in which the modifying step comprises increasing transmit power of a base station of the telecommunication network.

18. A method according to claim 1, in which the modifying step comprises adjusting resources scheduled to the user.

19. A method according to claim 1, in which the modifying step comprises traffic steering.

20. A method according to claim 1, in which the modifying step comprises identifying that the user is a priority user.

21. A method according to claim 1, in which the predicting step comprises performing statistical analysis on the data.

22. A network element of a telecommunication network adapted to control data service for a user, the network element adapted to carry out the steps of a claim 1.

23. A telecommunications network comprising a network element according to claim 22, a user equipment, a radio access network comprising a base station and a core network.

24. A computer program product comprising non transitory computer readable memory comprising instructions which when executed by one or more of processors of a telecommunications network cause a network element of the telecommunication network to perform the method steps of claim 1.

* * * * *